United States Patent Office 2,750,822
Patented June 19, 1956

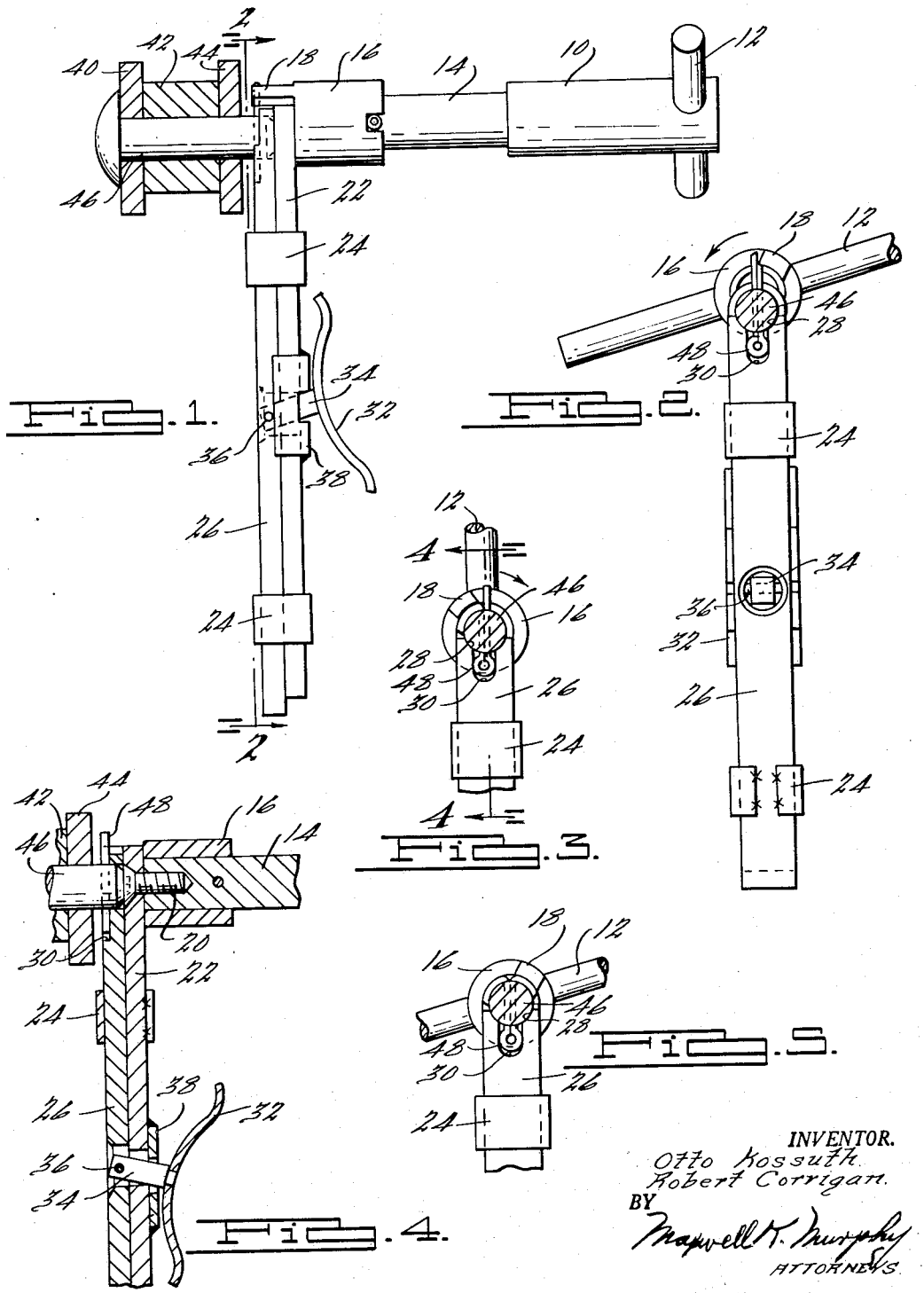

2,750,822
SLIDABLY ADJUSTABLE COTTER PIN BENDING TOOL

Otto Kossuth and Robert George Corrigan, Ypsilanti, Mich., assignors to Detroit Harvester Company, Detroit, Mich., a corporation of Michigan Application January 12, 1954, Serial No. 403,491

1 Claim. (Cl. 81—15)

This invention relates to a tool for bending cotter pins and the like.

Cotter pins are well known and extensively used as fasteners, particularly in places where an easily removable and easily replaceable fastening device is required.

It has been the practice to insert the cotter pin, then bend over or spread the legs thereof with a screw driver, pliers or similar tool. This method of securing the pin is unsatisfactory in that many times, only one leg is bent over and the legs are usually spread in such manner that they extend outwardly and constitute a hazard if the device fastened by the pin is used in proximity to human beings.

We have devised a simple tool for spreading the legs of the cotter pin after it has been inserted in the opening intended to receive it and for bending over the legs such that the pin is tightly and neatly retained in place.

In the accompanying drawings which illustrate a preferred form of the invention, Fig. 1 is an elevation of the tool showing application thereof in bending a cotter pin;

Fig. 2 is a section along line 2—2 of Fig. 1;

Fig. 3 is a fragmentary detail view of the tool and cotter pin showing the longer leg of the pin bent over;

Fig. 4 is an elongated section along the line 4—4 of Fig. 3; and

Fig. 5 is a view like Fig. 3, but showing both legs of the cotter pin bent over.

Referring to the drawings, it may be seen that our improved tool comprises a handle 10 having a hand-engageable cross member 12 and a reduced portion 14 to which is fixed an operating member 16. The latter has a shank portion 18 which is operable to bend the cotter pin legs as will be explained below.

Firmly attached to the handle 10 by means of a threaded fastener 20 is an elongated member 22. The head of the fastener 20 is countersunk in the member 22 as shown in Fig. 4, and the handle 10 is rotatable with respect to the member 22 to the extent permitted by the shank 18.

Slidably secured to the member 22 by the straps 24 is a member 26. The latter is provided at the end adjacent the handle with a round hole 28 adapted to receive one end of a round pin to be fastened by the cotter pin and a recessed slot 30 for receiving the cotter pin itself.

The member 26 is slidable with respect to the member 22 by means of the manually engageable member 32. The member 32 has a portion 34 extending laterally therefrom which is loosely attached to the member 26 by a pin 36 (Fig. 4). The portion 34 extends through a slot in the member 22 as shown, and rocking of the member 32 on the anvil 38 will cause sliding of the member 26 with respect to the member 22.

In the figures, a typical use of the tool is illustrated. Three structural members designated 40, 42 and 44, are to be rotatably or loosely secured together by a pin 46. The latter has a hole near its outer end through which a cotter pin 48 is to be inserted and fastened.

After the parts have been assembled and the cotter pin inserted in the hole in the pin 46, the tool is brought into juxtaposition with the parts such that the outer end of the pin 46 is in the hole 28 with the head of the cotter pin disposed in the slot 30, and the slide 26 is positioned as shown in Figs. 1 to 4 inclusive.

Rotation of the handle 10 then will cause the shank 18 to engage the longer leg of the cotter pin, but not the shorter leg (see particularly Fig. 2). Continued rotation in the direction of the arrow will bend the longer leg over around the pin 46 as shown in Fig. 3.

The member 32 is then rocked, thereby sliding member 26 forwardly as shown in Fig. 3 such that the shank 18 can engage the shorter leg of the cotter pin on reverse rotation of the handle and bend it over as shown in Fig. 5. The cotter pin is thus neatly and quickly spread and the pin 46 is firmly secured in place.

In the particular instance illustrated, the pin 46 secured several members of a folding automobile top linkage together, but the tool is useful in many other places where cotter pins are used. Workmen quickly become expert in manipulation of the tool, and a much more rapid and more satisfactory operation results as compared with previous methods of fastening cotter pins.

We claim:

A tool for fastening cotter pins having legs of unequal length comprising a handle portion, a slide disposed at substantially right angles to said handle and slidable relatively thereto, openings in one end of the slide for receiving the cotter pin and the member carrying the same, means carried by the handle operable by rotation thereof for bending over the legs of a cotter pin, said means comprising an eccentrically located shank projecting in an axial direction from said handle and overlapping in spaced relation the edge of said one end of the slide, said shank engaging the longer leg of the cotter pin when the slide is in one position and for bending over the shorter leg when the slide is in another position with the longer leg bent, and a manually operable lever to actuate said slide.

References Cited in the file of this patent
UNITED STATES PATENTS

| | | |
|---|---|---|
| 1,390,071 | Wetzstein | Sept. 6, 1921 |
| 1,824,083 | Hoff | Sept. 22, 1931 |
| 2,330,013 | Schultz | Sept. 21, 1943 |